(12) United States Patent
Abe et al.

(10) Patent No.: US 6,353,482 B1
(45) Date of Patent: *Mar. 5, 2002

(54) IMAGE FORMING SYSTEM WITH INDIVIDUAL MODE AND STANDARD MODE

(75) Inventors: Yoshinori Abe, Tama; Tadashi Suzuki, Tokyo; Masanori Sakai, Yokohama; Eiji Ohara, Kawasaki; Satoru Kutsuwada, Kawasaki; Satoshi Kaneko, Kawasaki, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,177

(22) Filed: Dec. 27, 1996

Related U.S. Application Data

(62) Division of application No. 08/361,237, filed on Dec. 21, 1994.

(30) Foreign Application Priority Data

Dec. 28, 1993 (JP) .............................................. 5-335923

(51) Int. Cl.[7] .............................................. G06F 15/00
(52) U.S. Cl. .......................... 358/1.15; 358/1.13; 399/9; 399/81
(58) Field of Search .......................... 358/1.1, 1.5, 1.12, 358/1.13, 1.14, 1.15, 400, 401, 468; 345/418; 399/8, 9, 77, 80, 81, 82, 85

(56) References Cited

U.S. PATENT DOCUMENTS

| | | | | |
|---|---|---|---|---|
| 5,131,079 A | * | 7/1992 | Miyawaki et al. | 358/1.19 |
| 5,323,393 A | * | 6/1994 | Barrett et al. | 370/449 |
| 5,355,447 A | * | 10/1994 | Knowlton | 395/139 |
| 5,467,202 A | * | 11/1995 | Washio et al. | 358/448 |
| 5,485,246 A | * | 1/1996 | Hayashi et al. | 355/202 |

* cited by examiner

*Primary Examiner*—Mark Wallerson
(74) *Attorney, Agent, or Firm*—Fitzpatrick, Cella, Harper & Scinto

(57) ABSTRACT

An image forming system that does not impair the operability of a standardized external apparatus functions in a standard mode and an individual mode. The mode of the system is selected using a mode-switching switch on an operation unit or a work station. A display screen of the operation unit is switched in correspondence with the selected mode.

27 Claims, 13 Drawing Sheets

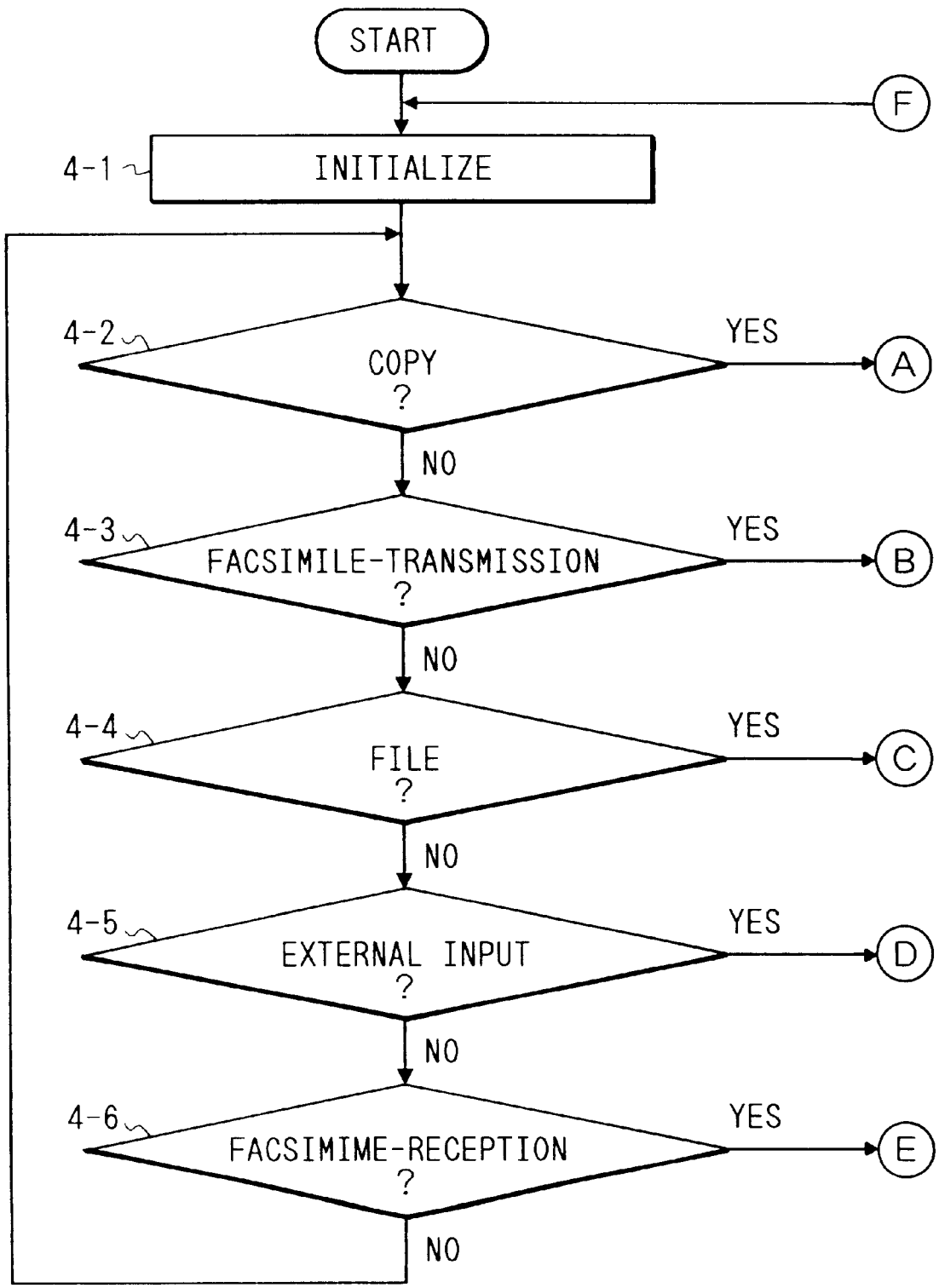

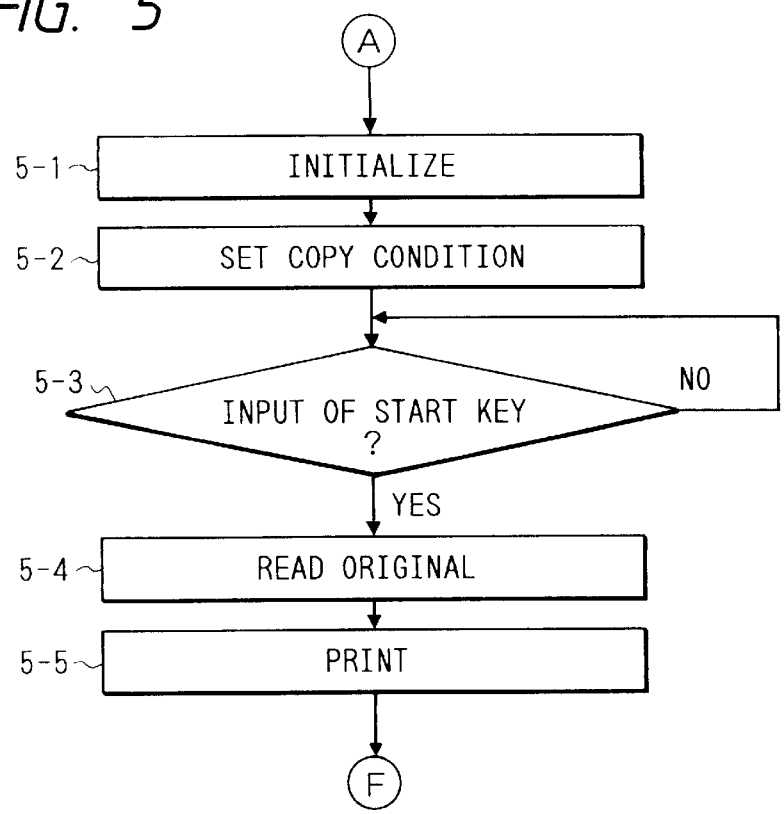
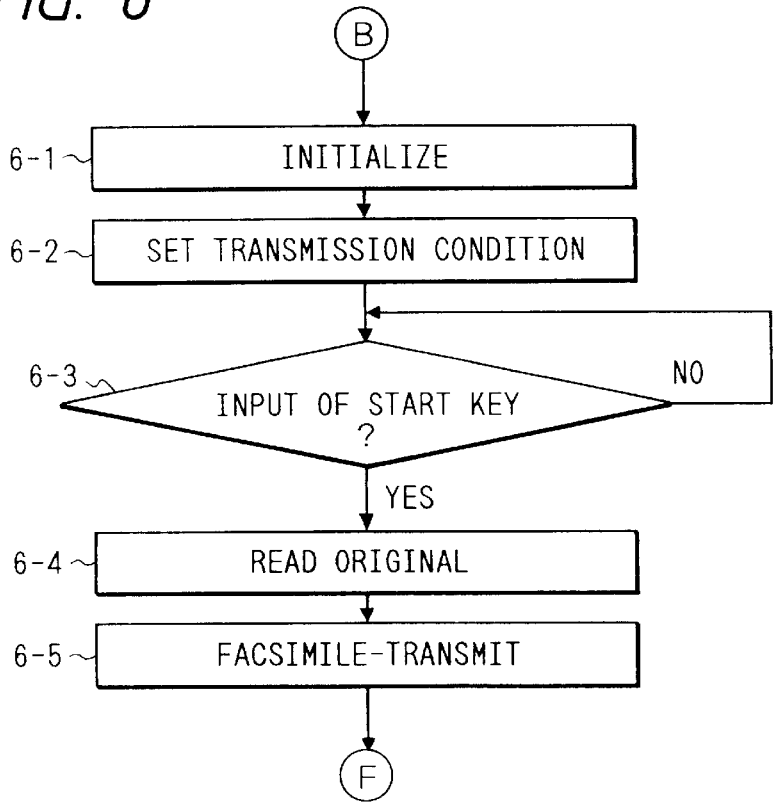

IMAGE FORMING SYSTEM WITH INDIVIDUAL MODE AND STANDARD MODE

This application is a division of application Ser. No. 08/361,237 filed Dec. 21, 1994.

BACKGROUND OF THE INVENTION

1. Field of the Invention

The present invention relates to an image forming system with an individual mode and a standard mode.

2. Description of the Related Art

3. Related Background Art

A system having a plurality of servers (external apparatuses) connected on a communication network, as shown in FIG. 10, has been proposed.

This system is constituted by work stations 110A and 110B capable of high-speed processing, an image scanner 112A which is connected to the work station 110A and is used for inputting image data, an image scanner 112B connected to a LAN (local area network) 113 (to be described later), the LAN 113 constituted by extending optical cables and the like, a file server 114 for transferring information (including image data) from the work stations 110A and 110B to a recording medium via the LAN 113, a magnetic disk device 115 which is connected to the file server 114 and stores information, a printer 117 for generating a hard copy of output information, a print server 116 for controlling the printer, a modem 119 for transmitting information from the work stations 11A and 11B or images from the image scanners 112A and 112B, and a FAX server 118 for controlling the modem.

Also, a hybrid machine 120 which has a plurality of functions, i.e., copying, FAX, file, and printer functions, is connected to the system.

In the above arrangement, the work station 110A or 110B confirms whether or not information is transmitted on the network, adds an address (destination address) of a receiving station (in this case, a server or another work station) and its own address (source address) to data (information) to be transmitted, and sends the data onto the LAN 113. With this operation, a communication of information to a desired server and a reception operation from a server are performed.

The hybrid machine 120 serves as a copying machine and a FAX machine as a stand-alone machine, and is also remote controlled by the work stations as in the single-function external apparatuses.

Such external apparatuses to be connected to the LAN are standardized to have a common control method/operability, and the like so as to allow connections among different kinds of apparatuses.

However, although standardized external apparatuses allow connections among different kinds of apparatuses, a special function of each external apparatus cannot be set by a standardized operation screen since these apparatuses have different functions.

SUMMARY OF THE INVENTION

It is an object of the present invention to provide an image forming system which can solve the above-mentioned problem.

It is another object of the present invention to provide an image forming system obtained by standardizing an image forming system having individual control.

It is still another object of the present invention to provide an image forming system with improved operability.

Other objects and features of the present invention will become apparent from the following specification and the accompanying drawings.

BRIEF DESCRIPTION OF THE DRAWINGS

FIG. 4 is a flow chart showing an example of a function processing sequence of the system of the embodiment shown in FIG. 1;

FIG. 5 is a flow chart showing the operation of a copy function;

FIG. 6 is a flow chart showing the operation of a facsimile-transmission function;

DESCRIPTION OF THE PREFERRED EMBODIMENTS

[First Embodiment]

Figure 1:
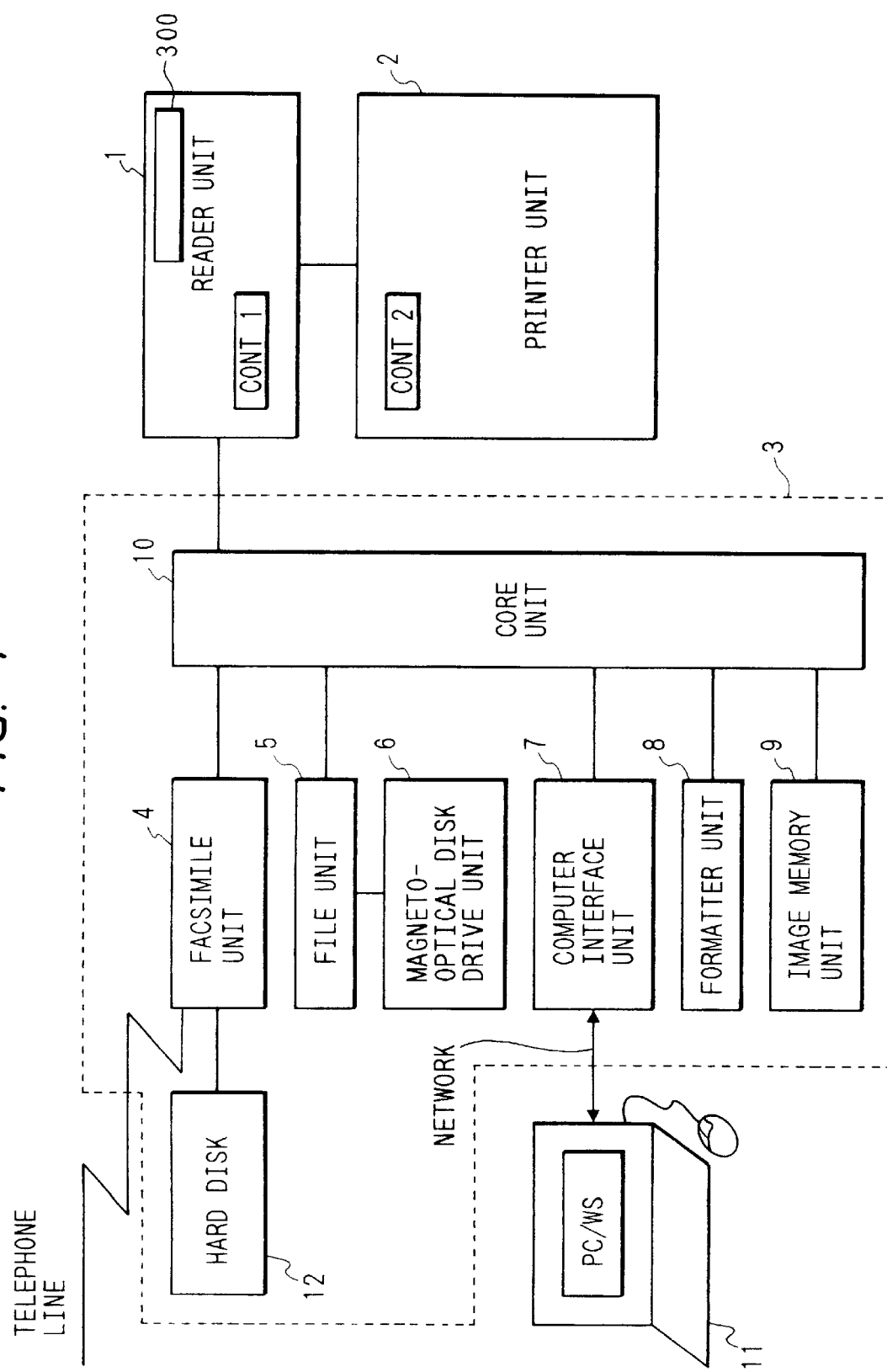
FIG. 1 is a block diagram for explaining the arrangement of a system according to an embodiment of the present invention.

FIG. 1 is a block diagram showing the arrangement of a system according to an embodiment of the present invention. A reader unit 1 reads an original image, and outputs image data according to the original image to a printer unit 2 and an image input/output control unit 3. The reader unit 1 has a controller CONT 1. The printer unit 2 records an image according to image data from the reader unit 1 and the image input/output control unit 3 on a recording sheet. The printer unit 2 has a controller CONT 2. The image input/output control unit 3 is connected to the reader unit 1, and includes a facsimile unit 4, a file unit 5, a computer interface unit 7, a formatter unit 8, an image memory unit 9, a core unit 10, and the like. The reader unit 1, the printer unit 2, and the image input/output control unit 3 can be operated in an individual mode including a function unique to this system, and in a standard mode for executing a function standardized on the market.

The facsimile unit 4 expands compressed image data received via a telephone line, and transfers the expanded image data to the core unit 10. On the other hand, the facsimile unit 4 compresses image data transferred from the core unit 10, and transmits the compressed image data via the telephone line. The facsimile unit 4 is connected to a hard disk 12, which can temporarily store received compressed image data. The file unit 5 is connected to a magneto-optical disk drive unit 6. The file unit 5 compresses image data transferred from the core unit 10, and stores the compressed image data in a magneto-optical disk set in the magneto-optical disk drive unit 6 together with a keyword used for retrieving the image data. Also, the file unit 5 retrieves compressed image data stored in the magneto-optical disk on the basis of a keyword transferred via the core unit 10, reads out and expands the retrieved compressed image data, and transfers the expanded image data to the core unit 10. The computer interface unit 7 serves as an interface between a personal computer or work station (PC/WS) 11 and the core unit 10. The formatter unit 8 develops code data representing an image and transferred from the PC/WS 11 to image data which can be recorded by the printer unit 2. The image memory 9 temporarily stores data transferred from the PC/WS 11. As will be described later, the core unit 10 controls data flows among the reader unit 1, the facsimile unit 4, the file unit 5, the computer interface unit 7, the formatter unit 8, and the image memory unit 9.

Figure 2:
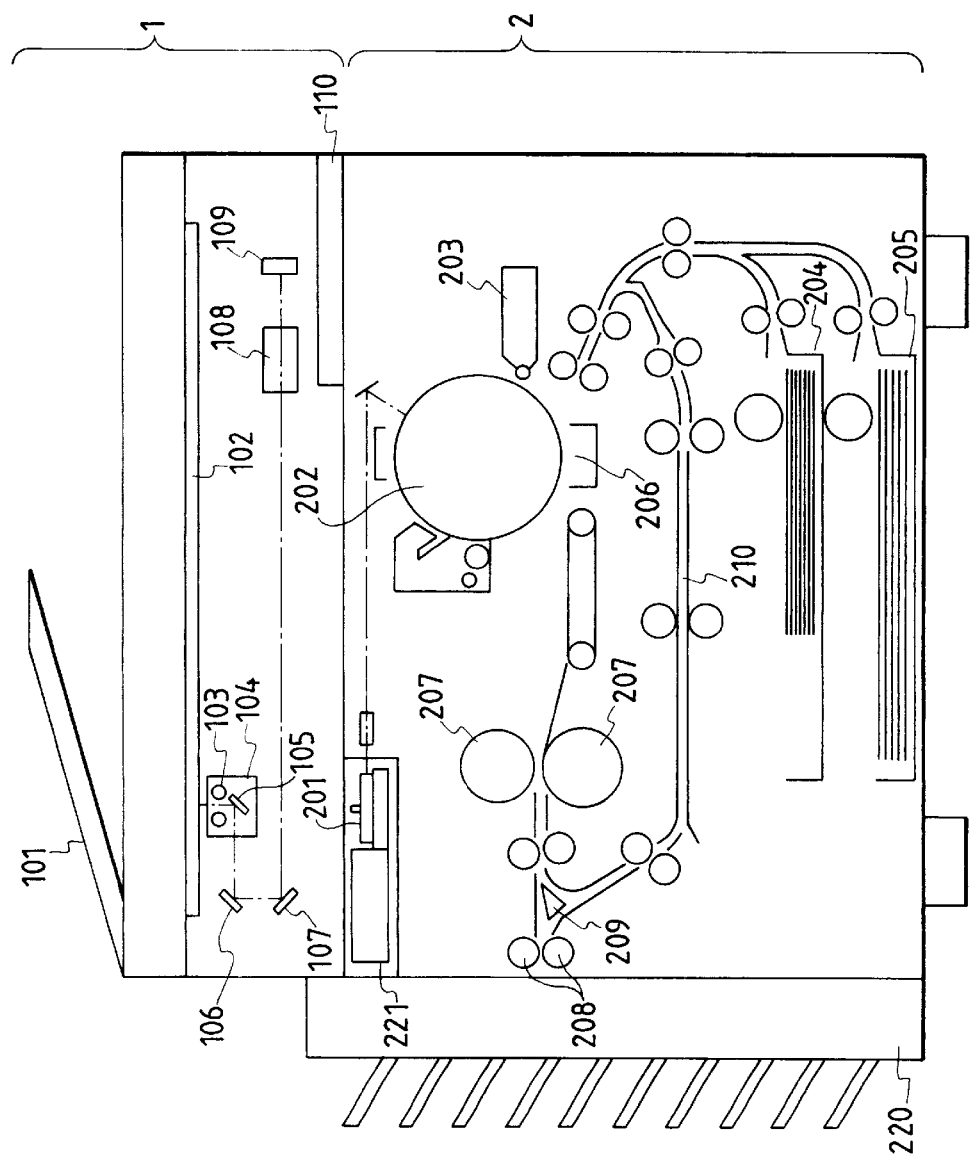
FIG. 2 is a sectional view for explaining the arrangement of a reader unit and a printer unit shown in FIG. 1.

FIG. 2 is a sectional view of the reader unit 1 and the printer unit 2. An original feeder 101 of the reader unit 1 feeds originals in turn from the last page onto a platen glass 102 one by one, and exhausts the original on the platen glass 102 upon completion of the reading operation of the original. When an original is fed onto the platen glass 102, a lamp 103 is turned on, and a scanner unit 104 begins to move, thus exposure-scanning the original. At this time, light reflected by the original is guided to a CCD image sensor (to be simply referred to as a CCD hereinafter) 109 via mirrors 105, 106, and 107, and a lens 108. In this manner, an image on the scanned original is read by the CCD 109. Image data output from the CCD 109 is subjected to predetermined processing in an image processing unit 110, and the processed image data is transferred to the printer unit 2 and the core unit 10 in the image input/output control unit 3.

A laser driver 221 of the printer unit 2 drives a laser emission unit 201, i.e., drives the laser emission unit 201 to emit a laser beam in correspondence with image data output from the reader unit 1. The laser beam is irradiated onto a photosensitive drum 202, and a latent image according to the laser beam is formed on the photosensitive drum 202. The latent image portion on the photosensitive drum 202 is attached with a developing agent by a developer 203. At a timing synchronized with the beginning of irradiation of the laser beam, a recording sheet is fed from one of cassettes 204 and 205, and is conveyed to a transfer unit 206. Then, the developing agent attached to the photosensitive drum 202 is transferred onto the recording sheet. The recording sheet on which the developing agent is transferred is conveyed to a fixing unit 207, and the developing agent is fixed onto the recording sheet by the heat and pressure of the fixing unit 207. The recording sheet which exits the fixing unit 207 is exhausted by exhaust rollers 208, and a sorter 220 sorts recording sheets by storing such exhausted recording sheets on respective bins. When a sorting mode is not selected, the sorter 220 stores recording sheets on the uppermost bin. When a dual-side recording mode is set, the recording sheet is conveyed to the position of the exhaust rollers 208, and thereafter, the rotational direction of the exhaust rollers 208 is reversed to guide the recording sheet to a re-feed convey path using a flapper 209. When a multiple recording mode is set, the recording sheet is guided to the re-feed convey path by the flapper 209 so as not to reach the exhaust rollers 208. The recording sheet guided to the re-feed convey path is fed to the transfer unit 206 at the above-mentioned timing.

Figure 3:
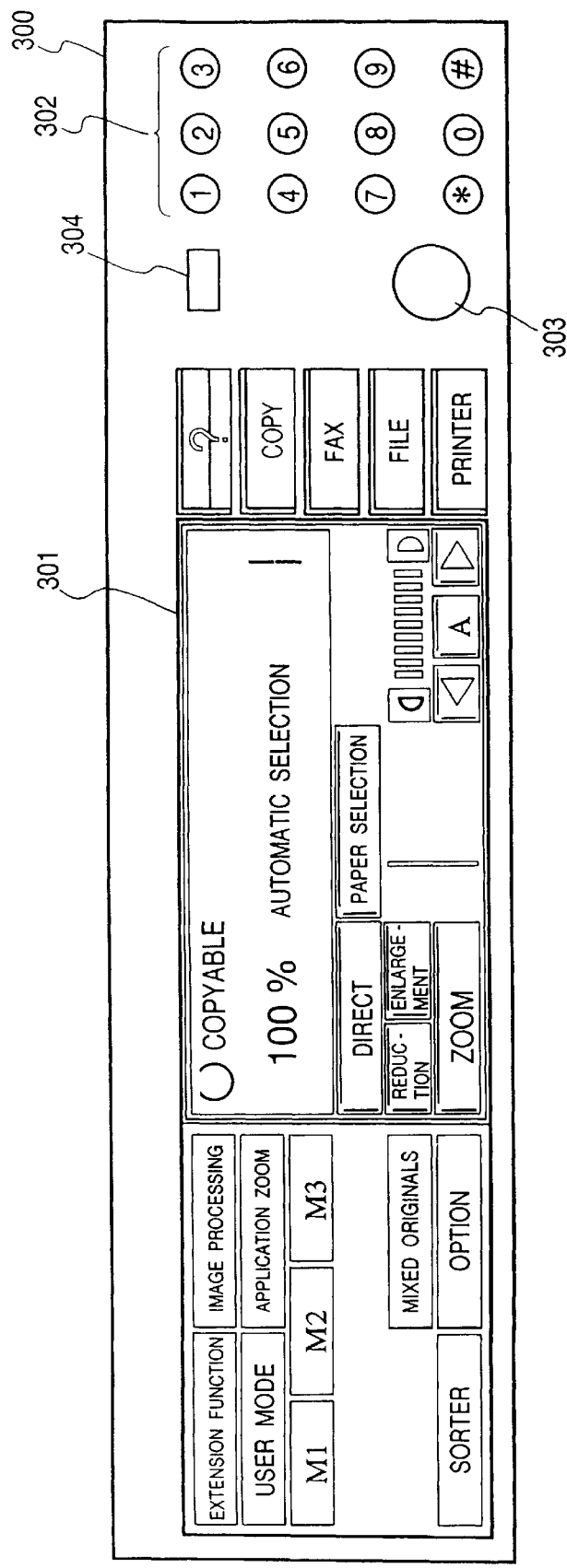
FIG. 3 is a view showing an example of an operation panel of the reader unit shown in FIG. 1 in an individual mode.

FIG. 3 is a view showing an operation panel 300 provided to the reader unit 1.

Referring to FIG. 3, a display unit 301 displays an operation state and a message. The display unit 301 comprises a touch panel display. FIG. 3 shows an example of a display on an operation screen in the individual mode. A ten-key pad 302 is used for inputting a numerical value such as a copy count. A start key 303 is arranged near the ten-key pad 302, and upon depression of the start key 303, a copy operation, an original reading operation, or the like is started.

Figure 11:
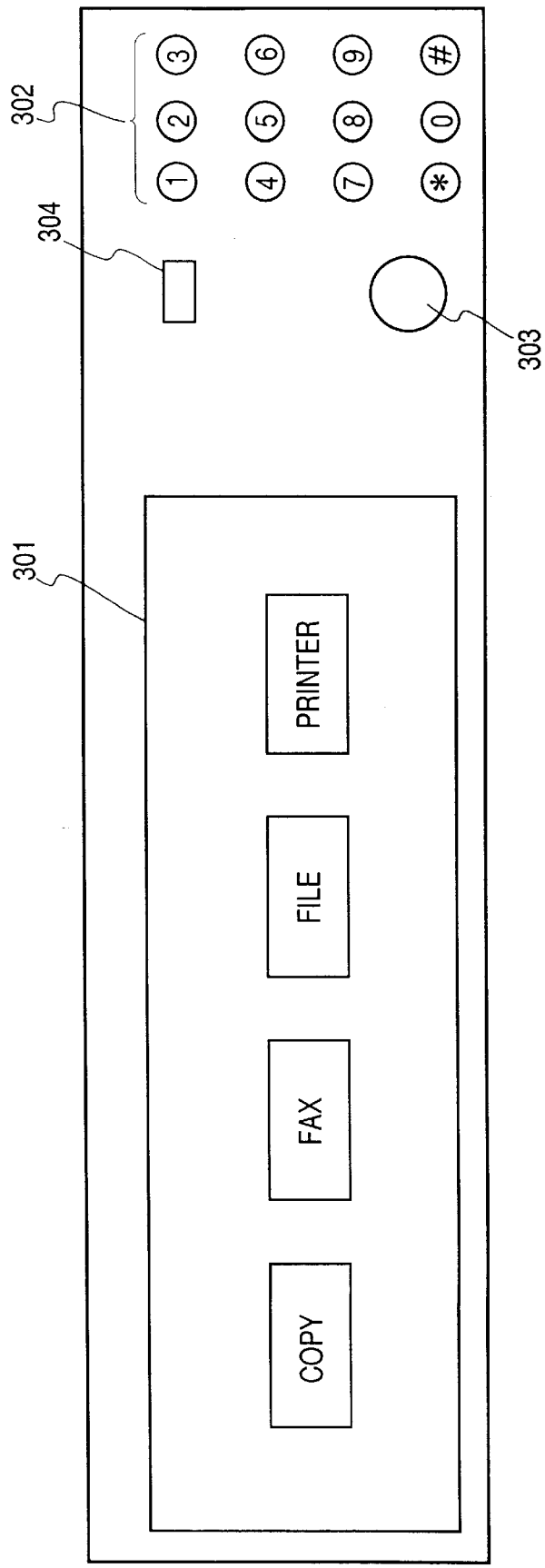
FIG. 11 is a view showing an example of an operation panel in a standard mode.

An operation mode switching switch 304 is also arranged near the ten-key pad 302, and each time the switch 304 is depressed, one of an operation screen in the standard mode and an operation screen in the individual mode is displayed on the display unit 301. FIG. 11 shows an example of a display on the operation screen in the standard mode, i.e., an initial screen in the standard mode. By touching a displayed portion of a function to be used, items associated with the function are hierarchically displayed.

FIG. 12, and FIGS. 4 to 9 are flow charts showing an example of the function processing sequence in this system.

Figure 12:
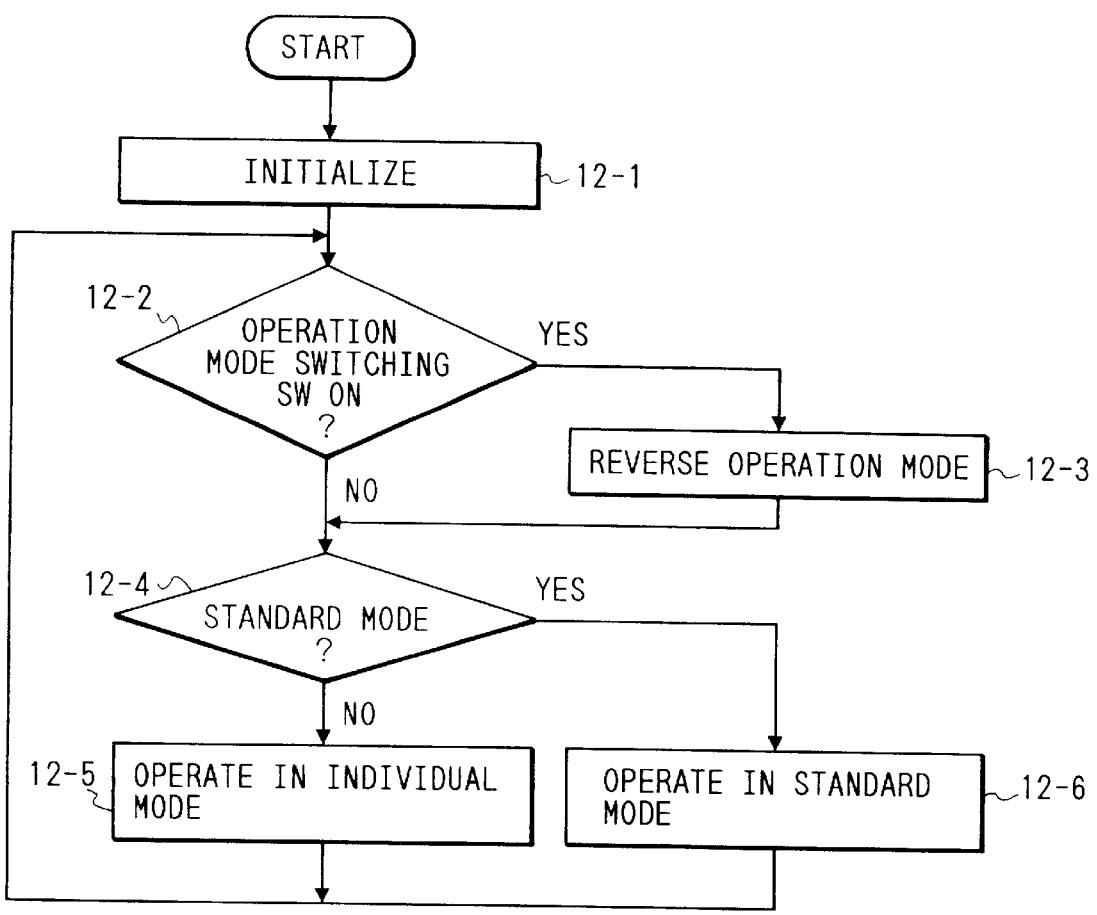
FIG. 12 is a flow chart showing processing for discriminating the standard mode and the individual mode.

After the power supply of the system is turned on, initialization shown in FIG. 12 is performed. Depending on the initial operation mode state, the standard operation screen shown in FIG. 11 or the individual operation screen shown in FIG. 3 is displayed as an initial display screen on the display unit 301 of the operation panel.

If it is determined in step 12-2 that the operation mode switching switch 304 is turned on, the operation mode is switched (12-3). For example, when it is determined that the operation mode switching switch 304 is turned on in the standard mode, the operation mode is switched to the individual mode. It is checked in step 12-4 if the current operation mode is the standard mode. If YES in step 12-4, the flow advances to step 12-6 to perform an operation in the standard mode; otherwise, i.e., if the current mode is the individual mode, the flow advances to step 12-5 to perform an operation in the individual mode.

The processing sequence in the individual mode will be explained below with reference to the flow chart in FIG. 4. Since the standard mode has the same standardized basic processing sequence, a description thereof will be omitted.

Operation mode selection keys for selecting one of copy, facsimile, file, and printer modes are displayed on the display unit 301 on the operation panel 300, and one of these modes is selected by touching a corresponding selection key portion. It is then checked if the selected mode is the copy mode (4-2). If YES in step 4-2, the flow advances to step 5-1 in FIG. 5.

On the other hand, if it is determined in step 4-2 that the copy mode is not selected, it is checked if a facsimile-transmission mode is selected (4-3). If YES in step 4-3, the flow advances to step 6-1 shown in FIG. 6.

On the other hand, if it is determined in step 4-3 that the facsimile-transmission mode is not selected, it is checked if the file mode is selected (4-4). If YES in step 4-4, the flow advances to step 7-1 shown in FIG. 7.

On the other hand, if it is determined in step 4-4 that the file mode is not selected, it is checked if a mode for inputting data from the computer interface unit 7 is selected, i.e., an external input is detected (4-5). If YES in step 4-5, the flow advances to step 8-1 shown in FIG. 8.

On the other hand, if it is determined in step 4-5 that the input mode is not selected, it is checked if a facsimile-reception mode is selected (4-6). If YES in step 4-6, the flow advances to step 9-1 shown in FIG. 9.

On the other hand, if it is determined in step 4-6 that the facsimile-reception mode is not selected, the flow returns to step 4-2 to repeat the same processing.

When it is determined in step 4-2 in FIG. 4 that the copy mode is selected, the flow shown in FIG. 5 is started. A copy operation is initialized (5-1), a copy condition is set by reading keys input from the operation panel (5-2), and the control waits for an input of the start key 303 (5-3). When the start key 303 is depressed, an original image is read by the reader unit 1 (5-4), and the read image is printed by the printer unit 2 (the above-mentioned print processing) (5-5).

Upon completion of the print operation, the flow returns to step 4-1 shown in FIG. 4 to perform initialization.

Furthermore, when it is determined in step 4-3 shown in FIG. 4 that the facsimile-transmission mode is selected, the flow shown in FIG. 6 is started. The facsimile-transmission is initialized (6-1), a facsimile-transmission condition is set by reading keys input from the operation panel (6-2), and the control waits for an input of the start key 303 (6-3). When the start key 303 is depressed, an original image is read by the reader unit 1 (6-4), and read image data is transferred to the facsimile unit 4. The facsimile unit 4 performs facsimile-transmission in accordance with a selected format and a predetermined protocol (6-5). Upon completion of the facsimile-transmission, the flow returns to step 4-1 shown in FIG. 4.

Figure 7:
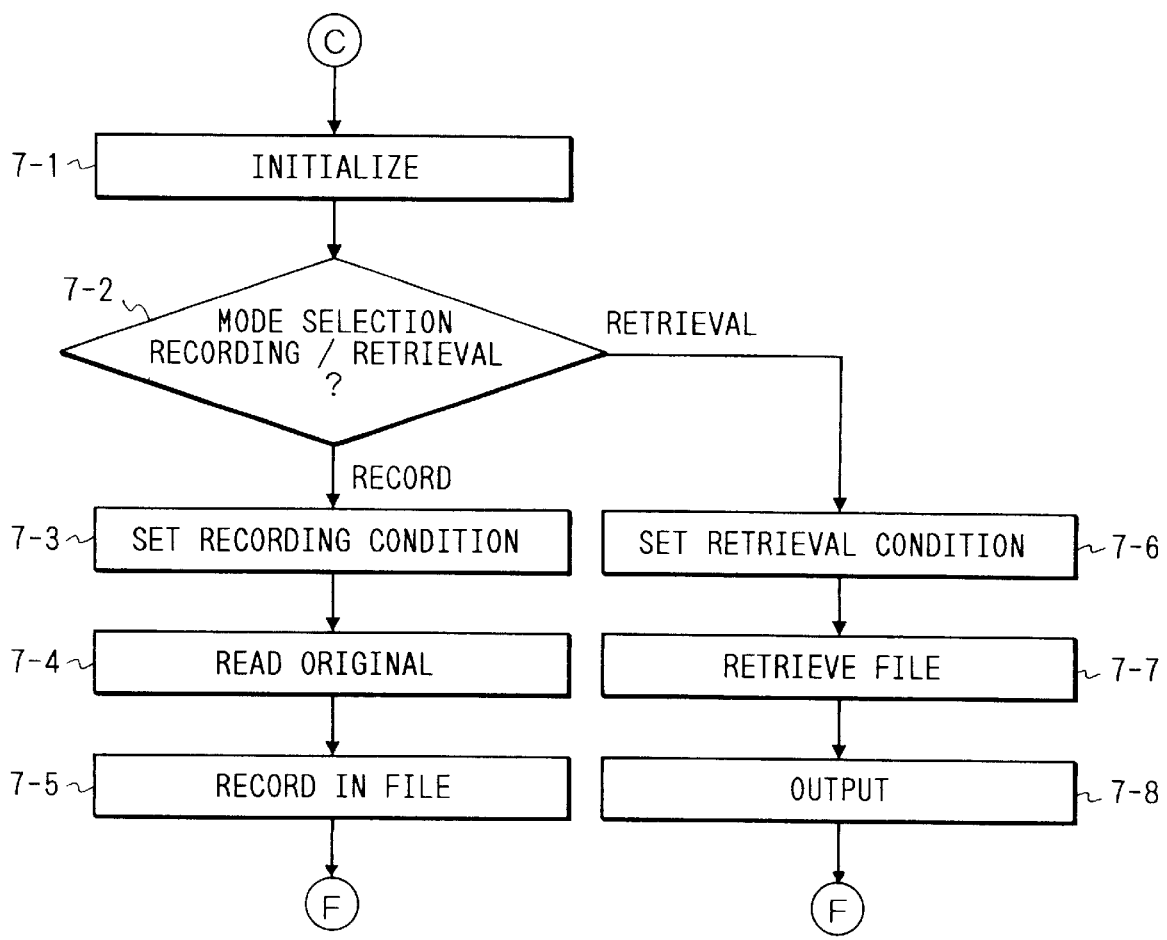
FIG. 7 is a flow chart showing the operation of a file function.

When it is determined in step 4-4 in FIG. 4 that the file mode is selected, the flow shown in FIG. 7 is started. The file operation is initialized (7-1). Mode selection keys for selecting file recording or file retrieval are displayed on the operation panel 300, and the control waits for key inputs by an operator (7-2). When the recording key is selected, a recording condition is set (7-3), an original image is read from the reader unit 1 (7-4), the read data is transferred to the file unit 5, and the data is recorded in the magneto-optical disk in the magneto-optical disk drive unit (external storage device) 6 (7-5).

On the other hand, when the file retrieval key is selected in step 7-2, a retrieval condition is set (7-6), a file is retrieved from the external storage device 6 (7-7), and the retrieval result is output (7-8). Upon completion of file recording or file retrieval, the flow returns to step 4-1 shown in FIG. 4 to perform initialization.

Figure 8:
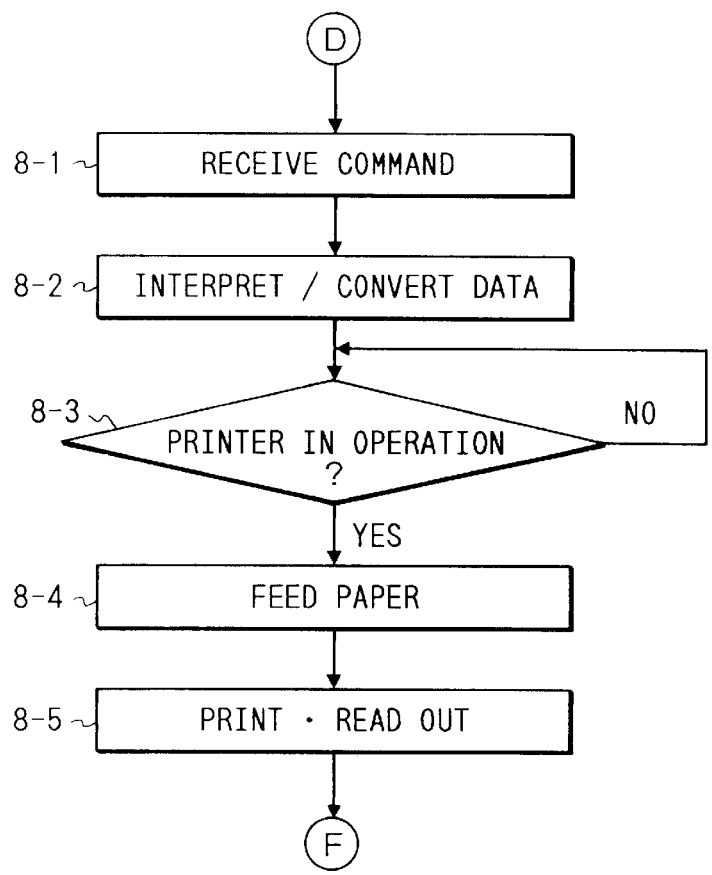
FIG. 8 is a flow chart showing the operation of an external input function.

Furthermore, if it is determined in step 4-5 in FIG. 4 that command data is input from an external device, the flow shown in FIG. 8 is started. The command data is received by the computer interface unit 7 (8-1), and is transferred to the formatter unit 8 via the core unit 10 to interpret and develop data on a bit map memory (8-2). Subsequently, it is checked in step 8-3 if the printer unit 2 is in operation. The control waits for the completion of the operation of the printer unit 2. Upon completion of the operation of the printer unit 2, an appropriate paper sheet is selected, and a paper feed operation of the selected paper sheet is started (8-4). The selected paper sheet is fed from one of the transfer sheet stack units (the paper cassettes) 204 and 205, and is conveyed to the transfer unit 206. In this case, the image developed on the bit map memory in the processing in step 8-2 is read out while performing rotation processing of the image in correspondence with information such as the direction, size, and the like of the paper sheet. The readout image is supplied to the exposure control unit (laser emission unit) 201, and is subjected to the above-mentioned print processing (8-5).

Upon completion of the print processing, data is output, and then, the flow returns to step 4-1 shown in FIG. 4 to perform initialization.

Figure 9:
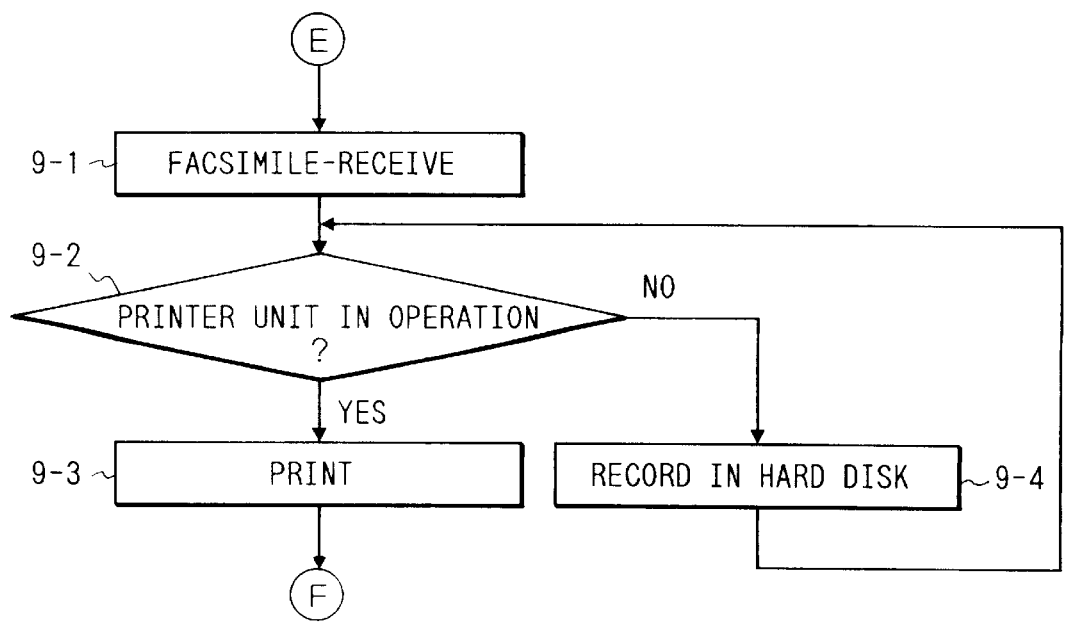
FIG. 9 is a flow chart showing the operation of a facsimile-reception function.
Figure 10:
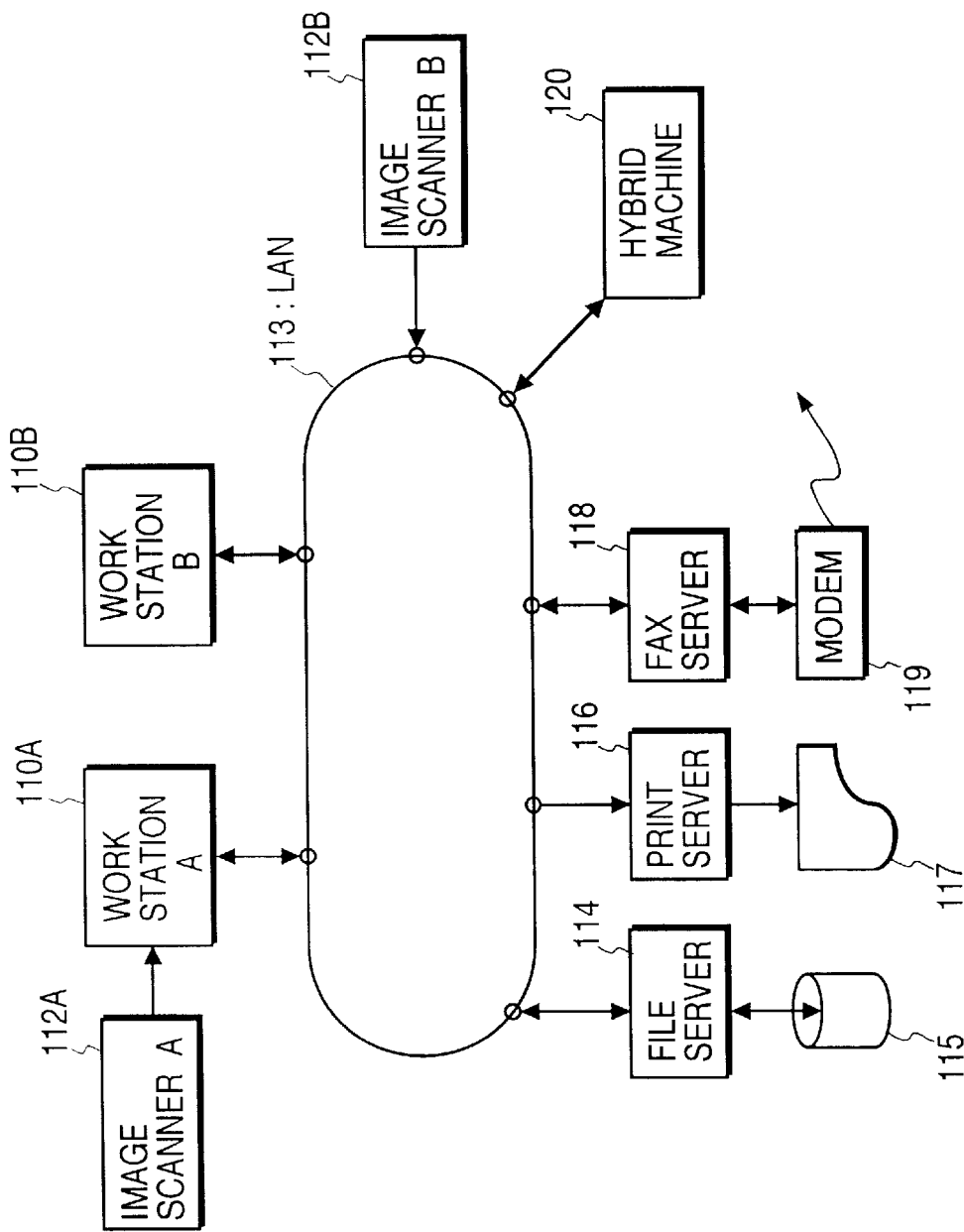
FIG. 10 is a diagram showing the arrangement of apparatuses connected to a network.

If it is determined in step 4-6 in FIG. 4 that the facsimile-reception mode is selected, the flow shown in FIG. 9 is started. First, facsimile-reception is performed (9-1), and it is then checked if the printer unit 2 is in operation (9-2). If YES in step 9-2, the printer unit 2 prints the received image (9-3), and the flow then returns to step 4-1 shown in FIG. 4. On the other hand, if NO in step 9-2, the received image is stored in the hard disk (9-4), and the flow returns to step 9-2.

[Second Embodiment]

In the first embodiment, the operation mode is selected by the operation mode switching switch 304 arranged on the operation panel 300 of the reader unit 1. Also, the operation mode can be switched from the work station 11 connected to the network.

Figure 13:
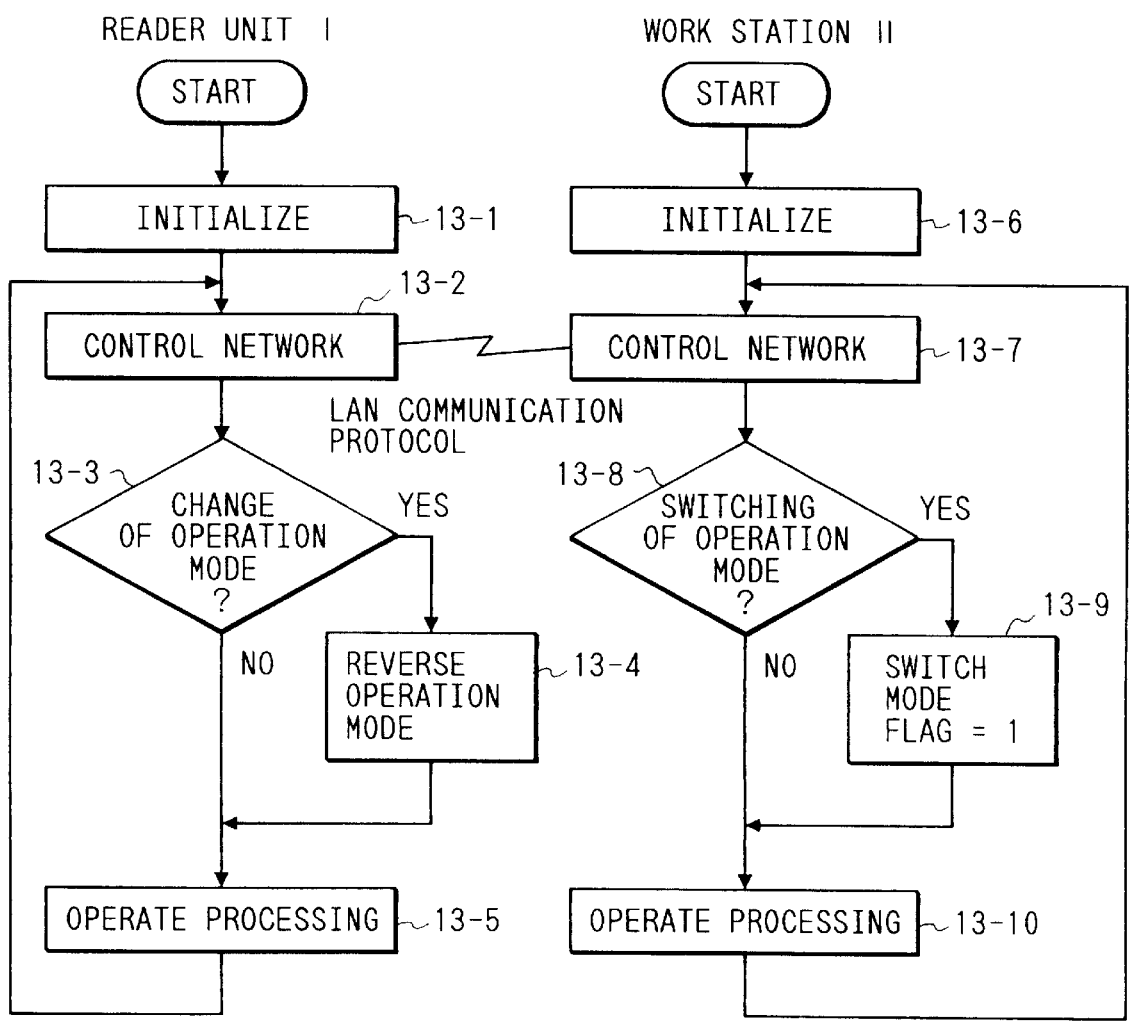
FIG. 13 is a flow chart showing the operations in the reader unit and a work station connected to the network.

FIG. 13 is a flow chart showing processing sequences in the reader unit 1 of the system and the work station 11 upon switching of the operation mode from the work station 11 in a remote control manner.

In the external apparatus, after the power supply is turned on, initialization shown in FIG. 13 is performed (13-1). In network control (13-2), a LAN protocol with the work station 11 is exchanged. In step 13-3, it is checked if a command for changing the operation mode is issued from the work station 11. This checking operation is achieved by checking if a FLAG (to be described later) in the work station 11 is 1. If FLAG=1, the operation mode is reversed in step 13-4. For example, if the current mode is the standard mode, the operation mode is switched to the individual mode. Thereafter, processing according to the new operation mode is performed in step 13-5, and the flow returns to step 13-2.

In the work station 11, after the power supply is turned on, initialization is performed (13-6). In network control in step 13-7, if the operation mode is to be switched, an operation mode switching command (FLAG) is supplied to the reader unit 1 via the LAN communication protocol. In step 13-8, it is checked if an icon which is displayed on the display of the work station 11 and is used for switching the mode is selected. If YES in step 13-8, the operation mode is switched (13-9). Thereafter, processing according to the new operation mode is executed in step 13-10, and the flow returns to step 13-7.

Figure 14:
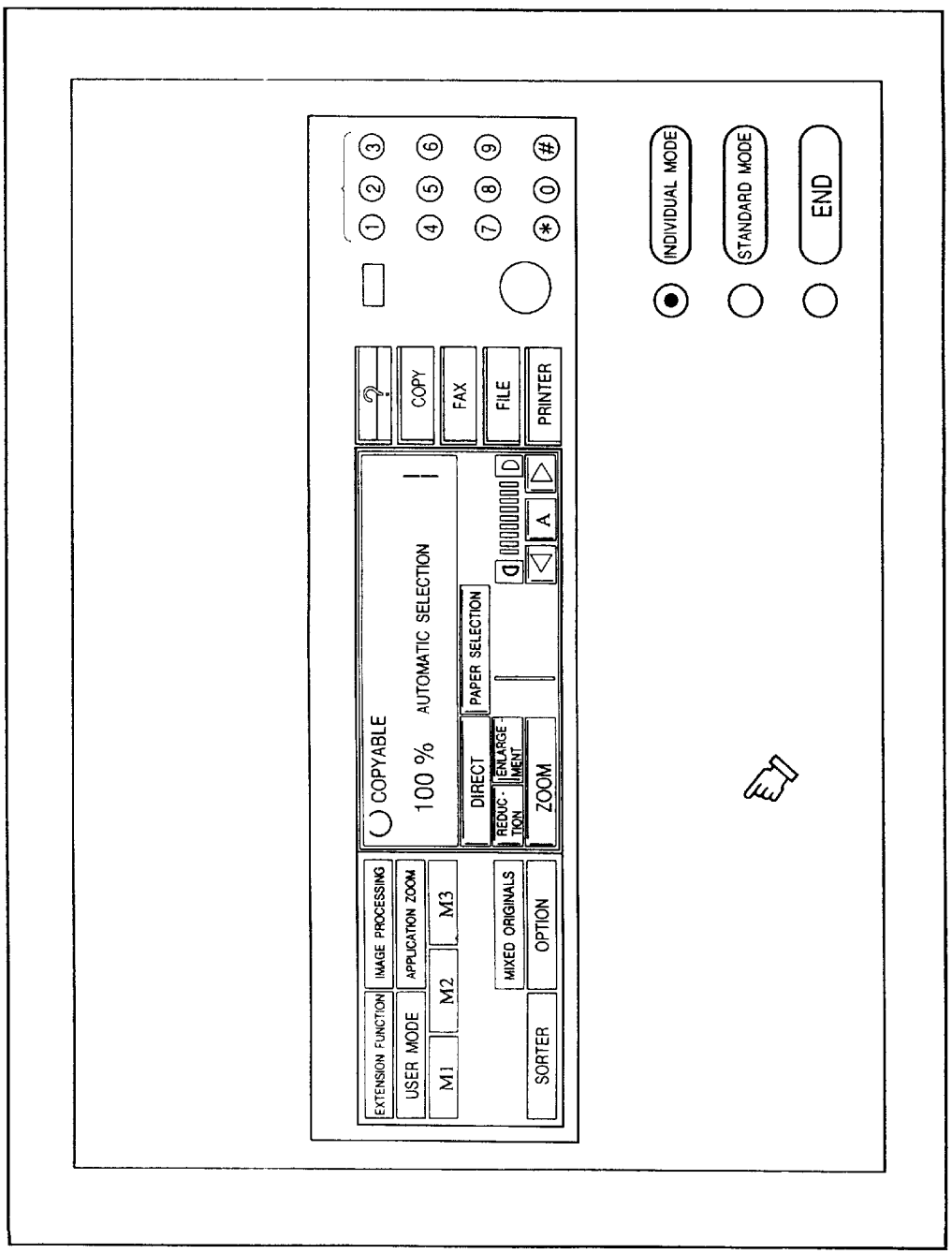
FIG. 14 is a view showing an example of a screen on the work station in the individual mode.
Figure 15:
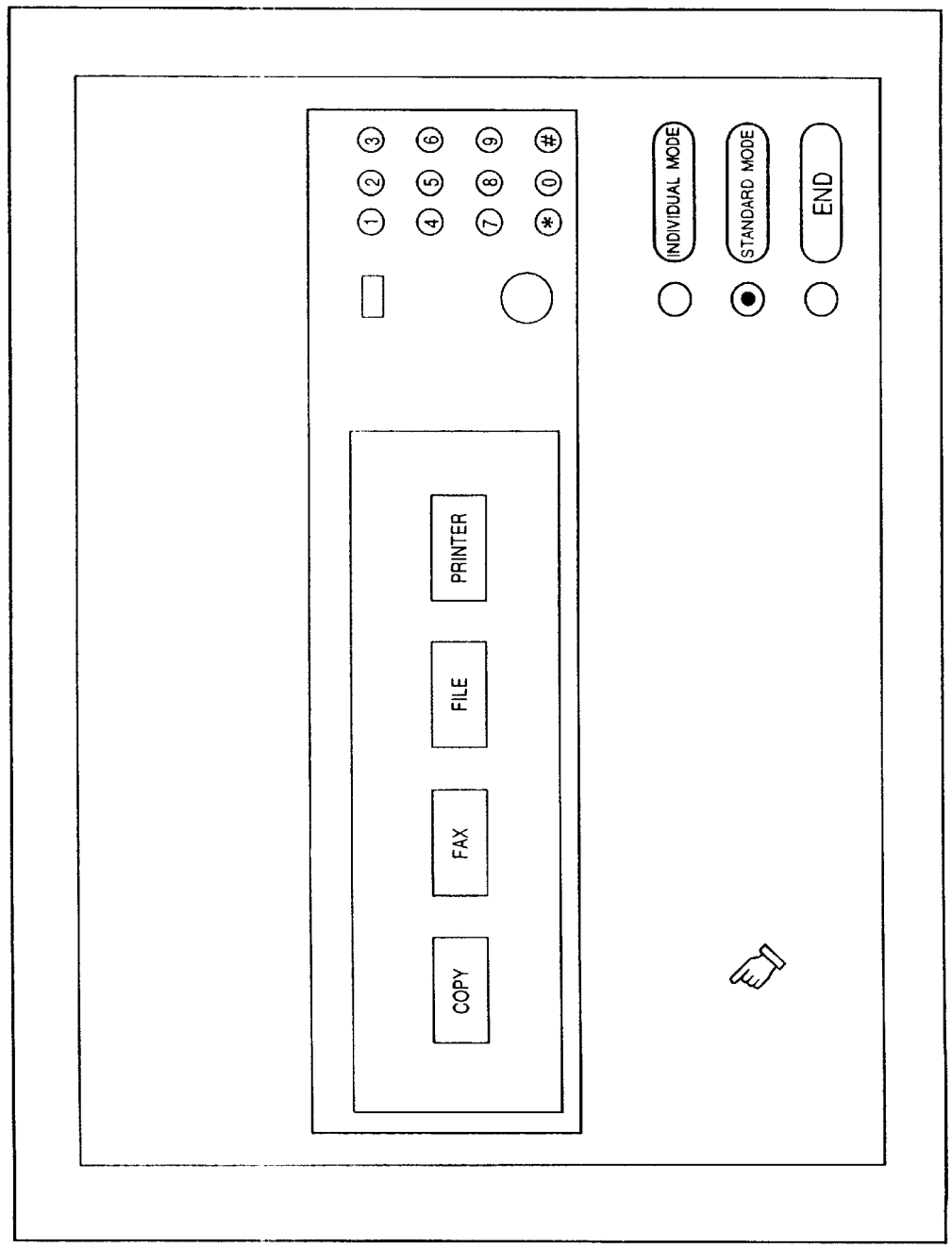
FIG. 15 is a view showing an example of an image on the work station in the standard mode.

FIGS. 14 and 15 show the screen on the work station 11 in steps 13-7 to 13-10 in FIG. 13.

FIG. 14 shows the screen of the work station 11 in the individual mode. When a hand-mark pointer is moved to a desired key portion by operating the mouse of the work station, and the button on the mouse is clicked there, a desired setting operation can be achieved. When the operation mode is to be switched to the standard mode in the state of the screen shown in FIG. 14, the pointer is moved to the portion of the standard mode, and the mouse button is clicked. FIG. 15 shows the screen of the work station 11 in the standard mode. When the operation mode is to be switched to the individual mode in this case, the pointer is moved to the portion of the individual mode, and the mouse button is clicked.

In this embodiment, a case has been exemplified wherein the operation mode of the system is switched by the operation screen of the reader unit 1 or by the computer such as the work station 11 in a remote control manner to switch the operation screen of the reader unit 1. However, the screen of the work station 11 may be switched in correspondence with the operation mode of the reader unit 1.

As described above, on the system having a plurality of operation modes, the operation mode can be switched from the operation panel or the work station connected to the LAN, and standardization can be achieved without impairing operability.

Since the screen on the operation unit is switched in correspondence with the operation mode, operability can be improved.

What is claimed is:

1. An image processing apparatus comprising:
    a connector adapted for connecting an external device to said image processing apparatus;
    a processor adapted for processing image data using a selected function of a plurality of functions for operating said apparatus;
    a selection device including a circuit adapted for selecting one of a first mode and a different second mode, wherein a respective plurality of the functions are selectable in each of the two modes, and wherein at least one common function is selectable both in the first mode and in the second mode;
    a display unit adapted for displaying a selected one of a plurality of different operation screens, the selected operation screen corresponding to the mode selected by said selection device, such that each mode has a respective different operation screen, including a respective different operation screen for the common function, displayed when that mode is selected, and one of the two modes further includes an operation screen for an individual function;
    an instruction circuit adapted for generating instructions based on respective manual operations performed in accordance with an operation screen currently displayed by said display unit;
    a receiver adapted for receiving a command from the external device through said connector; and
    a control circuit responsive to selection of one of the two modes by said selection device in accordance with the command received by said receiver, said control circuit adapted for causing said processor to perform processing using the function according to the operation screen of the selected mode.

2. An apparatus according to claim 1, wherein the operation screens respectively corresponding to the two modes have different respective layouts.

3. An apparatus according to claim 1, further comprising a touch panel, wherein said display unit displays the selected operation screen on said touch panel and said instruction circuit generates the instructions based on manipulations of said touch panel.

4. An apparatus according to claim 1, wherein the plurality of functions selectable in the first mode includes a function unique to the first mode in addition to all the functions selectable in the second mode.

5. A control method for a computer that includes a display and that is remotely connected to an image processing apparatus, the apparatus being capable of processing image data using a selected function of a plurality of functions for operating the apparatus, said method comprising the steps of:
    selecting one of a first mode and a different second mode, wherein a respective plurality of the functions are selectable in each of the two modes, and wherein at least one of the functions is selectable both in the first mode and in the second mode;
    displaying a selected one of a plurality of different operation screens, the selected operation screen corresponding to the mode selected in said selecting step such that each mode has a respective different operation screen displayed when that mode is selected;
    generating instructions based on respective manual operations performed in accordance with the operation screen currently displayed in said displaying step, the instructions including a respective instruction for selecting each of the functions; and
    responsive to selection of the function in accordance with an instruction generated in said generating step in either of the two modes, causing the apparatus remotely connected to the computer to perform processing using the selected function according to the operation screen of the selected mode.

6. A method according to claim 5, wherein the operation screens corresponding to the two modes have different respective layouts.

7. A method according to claim 5, wherein the computer includes a pointing device and an instruction is generated by the pointing device in said generating step.

8. A method according to claim 5, further comprising the step of causing the apparatus to perform in the mode selected in said selecting step.

9. A method according to claim 5, wherein the plurality of functions selectable in the first mode includes a function unique to the first mode in addition to all the functions selectable in the second mode.

10. A method according to claim 5, wherein said displaying step includes displaying information to identify the selected mode.

11. An image processing system that includes an image processing apparatus and a computer remotely connected to the apparatus, said system comprising:
    in the apparatus:
        a processor adapted for processing image data using any of a plurality of functions for operating the apparatus; and
        a control circuit adapted for causing said processor to perform processing using a selected function of the plurality of functions; and
    in the computer:
        a selection device including a circuit adapted for selecting one of a first mode and a different second mode, wherein a respective plurality of the functions are selectable in each of the two modes, and wherein at least one of the functions is selectable both in the first mode and in the second mode;
        a display unit adapted for displaying a selected one of a plurality of different operation screens, the selected operation screen corresponding to the mode selected by said selection device such that each mode has a respective different operation screen displayed when that mode is selected; and
        an instruction circuit adapted for generating instructions based on respective operations performed in accordance with an operation screen currently displayed by said display unit, the instructions including a respective instruction for selecting each of the functions,
    wherein said control circuit is responsive to selection of the function in accordance with an instruction generated by said instruction circuit in either of the two modes for causing said processor, remotely connected to said instruction circuit, to perform processing using the selected function according to the operation screen of the selected mode.

12. A system according to claim 11, wherein the operation screens respectively corresponding to the two modes have different respective layouts.

13. A system according to claim 11, wherein the computer further comprises a circuit adapted for informing the apparatus of the mode selected by said selecting device.

14. A control method according to claim 11, further comprising the step of, in the computer, informing the apparatus of the mode selected in said selecting step.

15. A system according to claim 11, wherein the plurality of functions selectable in the first mode includes a function unique to the first mode in addition to all the functions selectable in the second mode.

16. A system according to claim 11, wherein said display unit displays information to identify the selected mode.

17. A system according to claim 11, wherein the computer includes a pointing device and the instructions generated by said instruction circuit are generated according to the pointing device.

18. A control method for an image processing apparatus capable of processing image data using a selected function of a plurality of functions for operating the apparatus, said method comprising the steps of:

connecting an external device to the image processing apparatus via a connector;

selecting one of a first mode and a different second mode, wherein a respective plurality of the functions are selectable in each of the two modes, and wherein at least one common function is selectable both in the first mode and in the second mode;

displaying a selected one of a plurality of different operation screens, the selected operation screen corresponding to the mode selected in said selecting step, such that each mode has a respective different operation screen, including a respective different operation screen for the common function, displayed when that mode is selected, and one of the two modes further includes an operation screen for an individual function;

generating instructions based on respective manual operations performed in accordance with an operation screen currently displayed in said displaying step;

receiving a command from the external device through the connector; and responsive to selection of one of the two modes in said selecting step in accordance with the command received in said receiving step, causing the apparatus to perform processing using the function according to the operation screen of the selected mode.

19. A control method according to claim 18, wherein the operation screens corresponding to the two modes have different respective layouts.

20. A control method according to claim 18, wherein said displaying step includes displaying the selected operation screen on a touch panel of the image processing apparatus.

21. A control method according to claim 18, wherein the plurality of functions selectable in the first mode includes a function unique to the first mode in addition to all the functions selectable in the second mode.

22. A control method of an image processing system that includes an image processing apparatus and a computer remotely connected thereto, said method comprising the steps of:

in the apparatus:
processing image data using any of a plurality of functions for operating the apparatus; and
controlling said processing step to perform processing using a selected function of the plurality of functions; and in the computer:
selecting one of a first mode and a different second mode, wherein a respective plurality of the functions are selectable in each of the two modes, and wherein at least one of the functions is selectable both in the first mode and in the second mode;

displaying a selected one of a plurality of different operation screens, the selected operation screen corresponding to the mode selected in said selecting step such that each mode has a respective different operation screen displayed when that mode is selected; and generating instructions based on respective operations performed in accordance with an operation screen currently displayed in said displaying step, the instructions including a respective instruction for selecting each of the functions, wherein said controlling step is responsive to selection of the function in accordance with an instruction generated in said generating step in either of the two modes for causing said processing step to perform processing using the selected function according to the operation screen of the selected mode, said generating step being performed remotely from said controlling step.

23. A control method according to claim 22, wherein the operation screens corresponding to the two modes have different respective layouts.

24. A control method according to claim 22, wherein the plurality of functions selectable in the first mode includes a function unique to the first mode in addition to all the functions selectable in the second mode.

25. A control method according to claim 22, wherein said displaying step includes displaying information to identify the selected mode.

26. A control method according to claim 22, wherein the computer includes a pointing device and the instructions generated in said generating step are generated according to the pointing device.

27. A computer-readable storage medium storing a program for executing a control method for an image processing apparatus capable of processing image data using a selected function of a plurality of functions for operating the apparatus, the program comprising:

code for connecting an external device to the image processing apparatus via a connector;

code for selecting one of a first mode and a different second mode, wherein a respective plurality of the functions are selectable in each of the two modes, and wherein at least one common function is selectable both in the first mode and in the second mode;

code for displaying a selected one of a plurality of different operation screens, the selected operation screen corresponding to the mode selected by said code for selecting such that each mode has a respective different operation screen, including a respective different operation screen for the common function, displayed when that mode is selected, and one of the two modes further includes an operation screen for an individual function;

code for generating instructions based on respective manual operations performed in accordance with an operation screen currently displayed by said code for displaying;

code for receiving command from the external device; and responsive to selection of one of the two modes by said code for selecting in accordance with the command received by said code for receiving, code for causing the apparatus to perform processing using the function according to the operation screen of the selected mode.

* * * * *